Patented Oct. 8, 1940

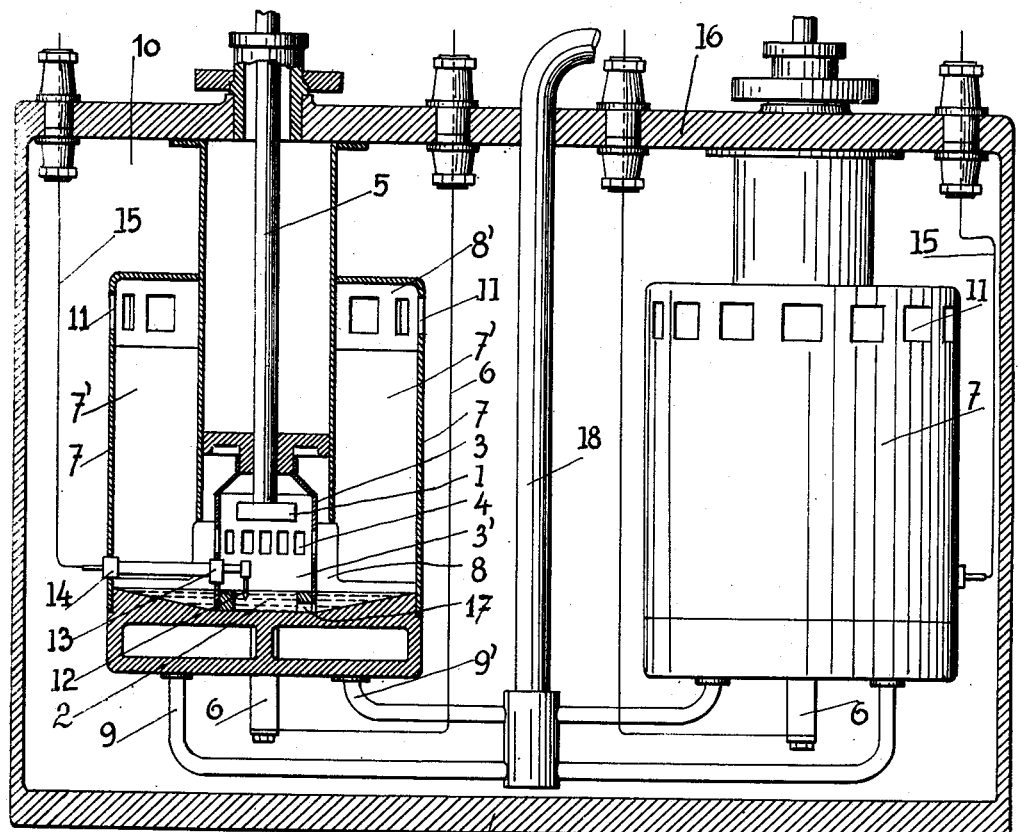
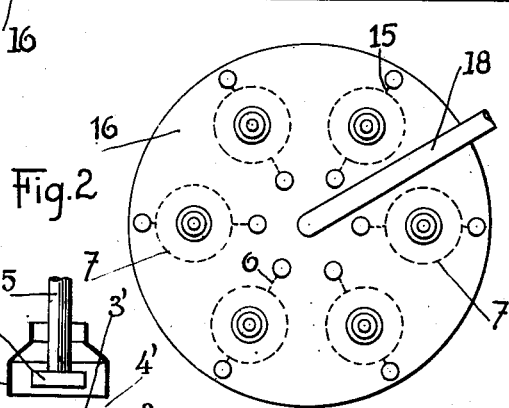
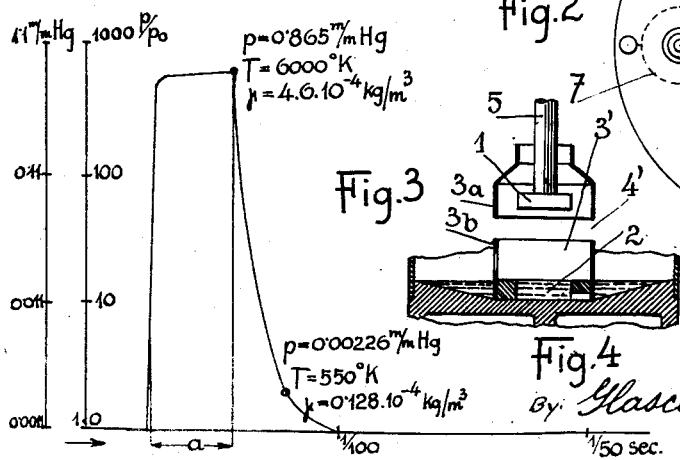

2,216,743

UNITED STATES PATENT OFFICE 2,216,743

VAPOR ELECTRIC DEVICE

Béla Karlovitz and Dénes Halász, Budapest, Hungary

Application March 11, 1938, Serial No. 195,420 In Hungary March 19, 1937

17 Claims. (Cl. 250—27.5)

The invention relates to a process and apparatus for intensifying the electric valve effect of ion discharge vessels.

The employment of discharge vessels by way of electric valves is already known. In the case of such discharge vessels conduction of current and stoppage of current are periodically alternating. These discharge vessels are in most cases filled with mercury vapour and are employed, for instance, for the rectification or other conversion of alternating current, or for the conversion of direct current into alternating current.

It is well-known that the phenomena of discharge is closely related to the density of the gas or vapour in the discharge vessel. The break-down voltage of a discharge gap at first diminishing proportionately with the diminution of pressure or density, whilst after such diminution has been continued beyond a certain minimum figure the break-down voltage rises again rapidly.

In the case of the usual ion discharge tubes the range of gas or vapour pressure extends from a few centimetres down to a few microns of mercury column. In order to enable high densities of current to be conducted, it is essential that the gas or vapour pressure should exceed a certain minimum. In the vicinity of this pressure, however, the danger of back-fire is relatively high, so that various measures have to be employed in order to prevent the latter. If the break-down voltage is increased by diminishing the gas or vapour density, difficulties will present themselves in connection with the ignition. Accordingly, in the case of the conversion of currents of high voltage and of high intensity, difficulties are liable to arise in connection with ion discharge vessels employed as electric valves.

According to the invention it is possible to eliminate these drawbacks and to construct discharge vessels suitable for high outputs.

According to the invention, the ion discharge vessels in which conduction and stoppage of current are periodically alternating are operated in such a manner, that the gas or vapour density in the whole discharge gap situated between the electrodes is increased during the period of the conduction of current and diminished, by means of the expansion of the gas or vapour, during the period of the stoppage of current.

The variation of the gas or vapour density can be effected by varying the pressure in the discharge space. For this purpose it is possible to proceed, for instance, in such a manner that during the conduction of current the vapours developed from the cathode are allowed to flow-out through a throttled passage into a cooled portion of the discharge vessel. In this case the electric arc, possessing a very high temperature, will during the period of conduction of current cause a large quantity of very hot vapours to be developed from the cathode, which vapours will produce the density of vapour suitable for the conduction of current. During the period of stoppage the vapour expanding and flowing-out adiabatically with the velocity of sound through a throttled passage into the cooled space of the ion discharge vessel will diminish in density and temperature in the discharge space to such an extent that any danger of back-fire will be diminished in the most far-reaching extent. Accordingly, it will be possible to employ these ion discharge vessels for conversion at very high voltages and current intensities.

In order to carry the process described above into effect, the ion discharge vessels are constructed in such a manner as to enable the gaspressure or the gas or vapour density in the whole discharge space situated between the electrodes to be varied so as to suit the various phases of operation. For instance, in the case of currents of low frequency, it is possible to employ discharge vessels in the discharge space of which the pressure is varied mechanically, e. g. by the motion of a piston. For the conversion of currents of higher frequency, however, such a method would be impracticable. In the case of the discharge vessel according to the invention, comprising a metal cathode from which vapours are being developed, the discharge space containing the discharge gap is separated from the rest of the interior of the discharge vessel so that it is only through one or more throttling passages that it communicates with the interior of the discharge vessel. In discharge vessels of this type it is possible for the quantity of vapour produced by the electric arc to produce a high density of vapour during the period of burning, whilst during the period of stoppage the density of vapour is suddenly substantially reduced owing to the outflow of the vapours from the discharge space.

According to the invention it is possible that to the discharge space, containing the anode and the cathode, which is provided in the interior of the discharge vessel and surrounded by a jacket fitted with throttling openings, there should be adjoined a cooling space for the purpose of condensing the cathode vapours. Preferably the cooler is constructed in such a manner, that the condensed metal vapours are again returned by it to the cathode. It is also possible to construct the cooler in such a manner, that its external wall should at the same time constitute the external wall of the discharge vessel.

For initiating the discharge, auxiliary devices of a known type may be employed. Thus, devices producing auxiliary discharges in the discharge space and further also control grids may be employed for the control of the discharge. The starting of the discharge can also be effected by means of such known devices as are fitted with a conductor of high specific resistance, made for instance of resistance material composed essentially of silicon carbide given a special treatment to add oxygen and nitrogen and which is sold under the trade name "Silite", which is operated by current impulses and is in contact with the evaporating metal of the cathode. The starting can also be effected by means of electron rays which are shot onto the cathode.

According to the invention it is, further, also possible to provide in a common discharge vessel a plurality of mutually independent discharge spaces, each of these communicating with the common interior of the discharge vessel through one or more openings. In this case each of the various discharge tubes is cooled separately, and the various discharge tubes may preferably be arranged in such a manner that the discharge spaces should communicate with the common interior of the discharge vessel through the cooling space of the cooler.

An embodiment, shown by way of example, of the apparatus according to the invention is illustrated in the accompanying drawing.

Fig. 1 is a section, partly an elevation of a portion of the discharge vessel comprising the discharge space and cooling space according to the invention.

Fig. 2 is a plan view, drawn to a smaller scale, of the discharge vessel.

Fig. 3 is a diagram showing the variation of the pressure or density.

Fig. 4 is a detail view.

The anode 1 and the cathode 2 are surrounded by the jacket 3 on which the throttling openings 4 are provided. The anode 1 and the cathode 2 and the jacket 3 are inclosing the discharge space 3'. The leads 5 and 6 of the anode and of the cathode are insulated in a known manner and led out through the vessel wall 16 so as to be insulated from the latter and from each other. The jacket 3 is surrounded by the cooler 7. The cooler is fitted with cooling ribs 7'. The cooling space 8 includes also the space between the radially arranged ribs 7', and extends upwardly to the upper space 8'. The pipes 9, 9' are serving for the admission and discharge of the cooling agent and joining on to a common conduit 18. 10 denotes the interior of the discharge vessel and 16 its external wall. The cooling space communicates through the openings 11 with the space 10 of the discharge vessel. The initiation of the ignition is effected by means of the conductor 12 of high specific resistance, which dips into the mercury electrode 2 and which is connected with the lead 15 led out through the insulating bodies 13 and 14. This lead is led out in an insulated manner through the vessel wall 16. The condensed mercury passes from the cooling space through the opening 17 to the cathode. For the purpose of purifying it, the mercury returned to the cathode can be passed over filters not shown on the drawing. The ignition of the electrodes 1 and 2 connected to the voltage is controlled in a known manner by means of current impulses impressed on the high resistance material 12. The electric arc produced will cause a relatively high quantity of mercury to become rapidly evaporated, in consequence whereof the pressure and density of the mercury vapour in the discharge space inclosed by the wall 3 will rise. Although with the rise of the pressure the mercury vapour will flow through the throttling openings 4 into the cooling space, a substantial over pressure will nevertheless be maintained by the new quantity of vapour developed during the period of burning. A state of equilibrium will be established after a very short time and a maximum vapour pressure will be set up. As after the extinction of the electric arc no further quantities of mercury vapour will be produced during the period of stoppage, the vapour will within a very short time flow out through the throttling openings 4 into the cooled space, in consequence whereof the density of the vapour in the discharge space will drop very rapidly. As during the period of burning of the electric arc the pressure in the discharge space will be a multiple of the pressure in the cooling space, the vapour will flow from the discharge space adiabatically and with the velocity of sound into the cooling space. In consequence hereof, the pressure as well as the density of the vapour will diminish very rapidly. Accordingly the blocking capacity of the valve will become very substantially increased within an extremely short time even before the stress exerted by the voltage on the discharge gap will develop, so that it will be possible to employ the valve in a very advantageous manner for rectifying alternating currents of usual frequency or for the conversion of direct current into such alternating currents.

As appears from Fig. 2, six electric valves are arranged in the space 10 of the discharged vessel. The cooling water is led through a common pipe 18 and branches 9, 9' to the individual valves. The cathodes 2 and the lead-outs 6 are insulated from each other. They may, however, also be mutually connected.

On the diagram shown on Fig. 3 the variations of pressure set up in the discharge space are shown in their correlation with the corresponding temperatures and vapour densities. There has been selected by way of example a discharge tube suitable for rectifying alternating current of 50 cycles, 3,000 amperes and 10,000 volts. It appears from the diagram that the temperature, the pressure and the density of the vapour are rising suddenly at the ignition and dropping suddenly after the extinction of the electric arc.

The magnitude of the pressure variation can be adjusted by dimensioning the throttling openings in a suitable manner. By way of example a vapour pressure of 1 micron of mercury column has been chosen, which rises in the discharge space during the time of the discharge to about one thousand times its original figure, i. e., to about 1 mm. In the example it has been supposed that a filling with mercury alone is employed and that the discharge vessel has, in the most far-reaching extent possible, been rendered void of any other gases. Instead of mercury vapour, it is, however, also possible to employ other metal vapours, as well as a gas filling or a plurality of gas fillings of the kinds known in connection with ion discharge tubes.

The minimum mercury vapour pressure is determined by the temperature of the cooler. Accordingly, the temperature of the cooler should in the case of higher voltages be chosen at a suitably low figure. For the conversion of voltages of 10,000—20,000 volts, it is possible to employ, by way of cooling agent, water of a temperature of 15—20° centigrade. In the case of the conversion of voltages higher than those named, a lower temperature produced by means of artificial cooling plants, e. g. a temperature below 0° centigrade is required in order to keep the mercury vapour pressure below the necessary limit during the period of stoppage.

Fig. 4 shows a different embodiment of the shell surrounding the discharge space, in which the shell is composed of two parts 3a and 3b, and the throttling opening 4' is situated between these two parts.

What we claim is:

1. An electric arc-discharge device comprising a vaporizing cathode, an anode cooperating therewith, a two-part shell enclosing the anode, the vaporizing cathode and the discharge space therebetween, the bottom part of said shell enclosing the cathode, the top part of said shell enclosing the anode, there being an annular space between the top and bottom parts of said shell to provide a vapor passage of limited capacity, and a condensing chamber surrounding said two-part shell.

2. An electric arc-discharge device comprising a vaporizing cathode, an anode cooperating therewith, a two-part shell enclosing the anode, the cathode and the discharge space therebetween, the bottom part of said shell enclosing the cathode, the top part of said shell enclosing the anode, there being an annular space between the top and bottom parts of said shell to provide a vapor passage of limited capacity, a condenser chamber surrounding said two-part shell, and cooling fins in said condensing chamber.

3. A vapor-electric device comprising a cathode of vaporizable material, an anode spaced from the cathode, means enclosing said cathode and anode and defining a discharge space therebetween, means for periodically initiating a discharge in said space, a condensing chamber separated from said discharge space, a restricted passage for controlling the flow of vapor from said discharge space to said condensing chamber whereby a high vapor pressure is maintained in said discharge space during the discharge interval and a low pressure is maintained at other times.

4. A vapor-electric device comprising a vaporizing cathode, an anode spaced from said vaporizing cathode and defining a discharge space therebetween, a shell enclosing said anode, cathode and the discharge space, an electrode of high specific resistance for initiating a discharge in the discharge space, a condensing chamber, there being a plurality of throttling passages between said discharge space and said condensing chamber whereby the pressure in said discharge space is responsive to discharge therein.

5. A vapor-electric device comprising a vaporizing vathode, an anode spaced from said vaporizing cathode and defining a discharge space therebetween, a shell enclosing said anode, cathode and the discharge space, an electrode of high specific resistance for ionizing the discharge space for initiating a discharge therein, a condensing chamber, there being a plurality of throttling passages between said discharge space and said condensing chamber whereby the pressure in said discharge space is responsive to discharge therein, and a jacket enclosing said shell and said condensing chamber, there being openings between said condensing chamber and said jacket whereby non-condensed gases can pass from said condensing chamber into said jacket.

6. A process for operating vapor electric valves, having alternate conducting and non-conducting periods, which comprises ionizing the arc space at the beginning of the conducting period to initiate the arc discharge, restricting the flow of the vapor produced by the arc to provide a high vapor pressure during the conducting period and expanding the vapor to rapidly diminish the pressure at the end of the conducting period.

7. A process for operating vapor electric valves, having alternate conducting and non-conducting periods, which comprises ionizing the arc space at the beginning of the conducting period to initiate the arc discharge, restricting the flow of the vapor produced by the arc to provide a high vapor pressure during the conducting period, conducting the vapor from the arc space and condensing it to rapidly reduce the vapor pressure during the non-conducting period.

8. A vapor-electric arc discharge device comprising a vaporizable metal cathode, an anode cooperating with said cathode, means for periodically initiating a discharge between said anode and cathode, a discharge chamber enclosing said anode and cathode, a condensing chamber and throttling openings between said discharge chamber and said condensing chamber.

9. A vapor-electric arc discharge device comprising a vaporizable metal cathode, an anode cooperating with said cathode, means for periodically initiating a discharge between said anode and cathode, a discharge chamber enclosing said anode and cathode, a condensing chamber surrounding said discharge chamber and throttling openings between said discharge chamber and said condensing chamber, and means for returning the condensed vaporizable metal to the cathode.

10. An arc discharge device comprising a vaporizable cathode, an anode cooperating therewith, means for initiating a discharge between said anode and cathode, a discharge chamber surrounding said anode, said cathode and the discharge space therebetween, a condensing chamber and throttling passages interconnecting said discharge chamber and said condensing chamber.

11. An arc discharge device comprising a vaporizable cathode, an anode cooperating therewith, means for initiating a discharge between said anode and cathode, a discharge chamber surrounding said anode, said cathode and the discharge space therebetween, a condensing chamber, throttling passages interconnecting said discharge chamber and said condensing chamber, and means for strongly cooling the condensing chamber.

12. A vapor electric valve having alternate conducting and non-conducting periods comprising a vapor emitting cathode, an anode spaced from said cathode, a shell surrounding said anode and cathode and the discharge space therebetween, means for ionizing said discharge space to initiate the conducting period therein, the discharge releasing vapor from said cathode, a condensing chamber of larger volume than said shell and passages for controlling the flow of vapor from said shell to said condensing chamber.

13. A vapor electric valve having alternate conducting and non-conducting periods comprising a vapor emitting cathode, an anode spaced from said cathode, a shell surrounding said anode and cathode and the discharge space therebetween, means for ionizing said discharge space to initiate the conducting period therein, the discharge releasing vapor from said cathode, a condensing chamber of larger volume than said shell and passage means for removing the ions and vapor from the shell at the end of the conducting period.

14. A vapor-electric device comprising a cathode of vaporizable material, an anode spaced from the cathode, a shell surrounding the anode and cathode and defining a discharge space therebetween, means for periodically initiating a discharge in said space, a condensing chamber separated from said discharge space, and restricted passages for controlling the flow of vapor from said discharge space to said condensing chamber whereby a high vapor pressure is maintained in said discharge space during the discharge interval and a low pressure is maintained at other times, and means for maintaining the condensing chamber at a predetermined temperature.

15. The process of operating a vapor electric valve, having alternate conducting and non-conducting periods, which consists in initiating an arc in the arc space at the beginning of each conducting period, controlling the flow of the vapor generated by the arc to maintain a high vapor pressure in the arc space during the conducting period and a low vapor pressure during the non-conducting period.

16. The process of operating an alternately conducting and non-conducting vapor arc device which comprises generating a large volume of vapor during the conducting period, restricting the flow of vapor from the arc path to maintain a high vapor pressure during the conducting period and expanding the vapor to diminish the vapor pressure during the non-conducting period.

17. A process for operating a vapor arc device having alternately conducting and non-conducting periods which comprise igniting a cathode spot at the beginning of the conducting period restraining the flow of vapor evolved from the cathode to maintain a high vapor pressure during the conducting period and expanding the vapor to secure a low vapor pressure during the non-conducting period.

BÉLA KARLOVITZ.
DÉNES HALÁSZ.